Patented Dec. 9, 1941

2,265,286

UNITED STATES PATENT OFFICE 2,265,286

PREPARATION OF VINYL HALIDES

Archie B. Japs, Cuyahoga Falls, Ohio, assignor to The B. F. Goodrich Company, New York, N. Y., a corporation of New York No Drawing. Original application July 19, 1938, Serial No. 220,129. Divided and this application February 14, 1940, Serial No. 318,886

7 Claims. (Cl. 260—656)

This invention relates to the preparation of vinyl halides by the addition of a hydrogen halide to acetylene, and has as its principal object to provide a catalyst having longer life and greater activity than catalysts now known.

It is known that when a gaseous mixture of hydrogen chloride and acetylene is passed over mercuric chloride at an elevated temperature vinyl chloride is formed. These vapor phase reactions are ordinarily carried on at from 180° to 250° C., and are strongly exothermic. Mercuric chloride, however, has a vapor pressure of 25 mm. of mercury at 200° C., of 75 mm. at 225° C., of over 150 mm. at 250° C., and of 760 mm. at 301° C. It can be readily seen that whenever mercuric chloride is used as the catalyst in a vapor phase reaction, not only is the catalyst quickly lost by sublimation, but a contaminated product is produced. This fundamental difficulty with mercuric chloride has led to the search for other catalysts, but no material as active as mercuric chloride has previously been discovered. Less active materials have often been used, however, in spite of the low yields obtained, to enable the reaction to be performed in the optimum temperature range.

I have discovered that complex salts of mercuric chloride and chlorides of alkaline earth metals are catalysts for the addition of hydrogen chloride to acetylene. Not only are these materials much less volatile than mercuric chloride, but they give increased conversion to vinyl chloride.

Any complex salts within the class defined may be profitably employed as catalysts. Double salts such as $HgCl_2 \cdot CaCl_2$ and $HgCl_2 \cdot BaCl_2$ are very satisfactory materials. Other complex salts such as $HgCl_2 \cdot 2BaCl_2$, $HgCl_2 \cdot 2SrCl_2$, and $$HgCl_2 \cdot CaCl_2 \cdot BaCl_2$$

may also be used if desired. Since magnesium chloride is similar in many of its properties to the alkaline earth chlorides, it is considered for the purposes of this invention to be the equivalent thereof and is included within the scope of the claims. The particular complex salt employed will naturally depend upon the temperature at which the reaction is being performed, complex salts containing higher proportions of the alkaline earth metal chlorides being employed at higher temperatures.

The life and activity of the catalyst for vapor phase reactions is further increased if it is deposited upon a body having high surface action. Porous and substantially inert materials such as activated charcoal, silica gel, activated alumina, etc. are ordinarily employed, although other materials having high surface action, of which a number are now known, may be used if desired.

The complex salts may be formed in any desired manner. Although mercuric chloride is only slightly soluble in cold water, mixtures of mercuric chloride and an alkaline earth metal chloride dissolve readily. In a preferred method of preparing the catalyst, acetone or other penetration-assisting material is added to an aqueous solution of the complex salt, and the solution is absorbed on activated charcoal. The impregnated material is then dried in an oven, as much of the water as possible being removed because the anhydrous complex salts catalyze the reaction to a much greater extent than the materials containing even small amounts of water.

The extent of the improvement effected by this invention is illustrated by the following comparative tests. Equimolar quantities of acetylene from which phosphine, ammonia, and hydrogen sulfide had been removed and anhydrous hydrogen chloride were passed at about 200° C. through a tube containing a catalyst consisting of 33 gms. of mercuric chloride deposited upon 127 grams of activated charcoal. In another test, a catalyst consisting of a complex salt containing mercuric chloride 33 grams and barium chloride 30 grams deposited upon 127 grams of activated charcoal was substituted for the mercuric chloride catalyst. Since the catalytic action under the above conditions is essentially a local one, the rate of deterioration of the catalyst could be determined by measuring the rate of movement of the exothermic reaction zone along the tube. In this test it was found that 25% of the mercuric chloride catalyst had deteriorated in 80 minutes, while the complex salt of mercuric chloride and barium chloride was used for 230 minutes before 25% of the catalyst was exhausted. In addition, the complex salt catalysts gave nearly quantitative conversions whereas only 65% of the theoretical conversion was obtained with the mercuric chloride.

The percent conversion obtained when a carrier of high surface action is used is dependent to a large extent upon the concentration of the double salt that is used. Since the reaction is so strongly exothermic, it has sometimes been found advisable to employ two or more catalytic tubes, the first containing a low concentration of a complex salt deposited upon a body having high surface action to cause partial reaction and the other tubes containing successively higher concentrations of the complex salt catalyst to complete the reaction.

Although this reaction has been described in detail in respect to vinyl chloride, it is to be understood that the other vinyl halides may be likewise prepared. Vinyl bromide, for instance, may be prepared by reacting acetylene and hydrogen bromide in the presence of a complex salt of mercuric bromide and an alkaline earth metal bromide. Many modifications which will be apparent to those skilled in the art are accordingly within the spirit and scope of the invention as defined in the appended claims.

This application is a division of Serial No. 220,129 filed July 19, 1938 now Patent No. 2,225,635.

I claim:

1. The method of preparing a vinyl halide which comprises reacting acetylene and a hydrogen halide in the vapor phase in the presence of a solid complex salt of a mercuric halide and an alkaline earth metal halide.

2. The method of preparing vinyl chloride which comprises reacting acetylene and hydrogen chloride in the vapor phase in the presence of a solid complex salt of mercuric chloride and an alkaline earth metal chloride.

3. The method of preparing vinyl chloride which comprises reacting acetylene and hydrogen chloride in the vapor phase in the presence of a solid complex salt of mercuric chloride and an alkaline earth metal chloride, said complex salt being deposited upon a body having a high surface action.

4. The method of preparing vinyl chloride which comprises reacting acetylene and hydrogen chloride in the vapor phase in the presence of a solid double salt of mercuric chloride and barium chloride, said double salt being deposited upon activated charcoal.

5. The method of preparing vinyl chloride which comprises passing an equimolar mixture of acetylene and hydrogen chloride successively through at least two tubes containing a catalyst consisting of a solid complex salt of mercuric chloride and an alkaline earth metal chloride, said complex salt being deposited upon a body having high surface action, the catalyst in the first tube being present in a concentration insufficient to cause complete reaction and the catalysts in the succeeding tubes being present in successively higher concentrations whereby essentially quantitative conversion is obtained.

6. A catalyst for the vapor phase reaction of acetylene and a hydrogen halide to form a vinyl halide, said catalyst comprising essentially a solid complex salt of a mercuric halide and an alkaline earth metal halide supported on a porous carrier.

7. A catalyst for the vapor phase reaction of acetylene and hydrogen chloride to form vinyl chloride, said catalyst comprising essentially a solid complex salt of mercuric chloride and barium chloride supported on activated charcoal.

ARCHIE B. JAPS.